Aug. 23, 1927.

F. ROGERS 1,640,297

WHEEL OR TIRE HANDLING APPARATUS

Filed March 8, 1926

WITNESSES

INVENTOR
FLORENCE ROGERS
BY
ATTORNEYS

Patented Aug. 23, 1927.

1,640,297

UNITED STATES PATENT OFFICE.

FLORENCE ROGERS, OF LAKEWOOD, NEW JERSEY.

WHEEL OR TIRE HANDLING APPARATUS.

Application filed March 3, 1926, Serial No. 93,313, and in Germany September 28, 1925.

The present invention is concerned with the provision of an apparatus for facilitating the handling of wheels and tires when mounting or demounting the wheels or tires from an automotive vehicle. It is peculiarly suited as an aid to women or elderly men in handling the relatively heavy wheels or tires, which as conventionally constructed, especially the disc wheels, are very heavy and difficult to manipulate.

Objects of the invention are to provide a device of this character which may be conveniently attached to any ordinary mechanical or hydraulic jack, a device which will be of simple, practical construction, which will be rugged and durable in use, which will be adjustable to accommodate various sized tires and wheels, and a device which may be manufactured with comparative economy and manipulated with ease.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Figure 1:
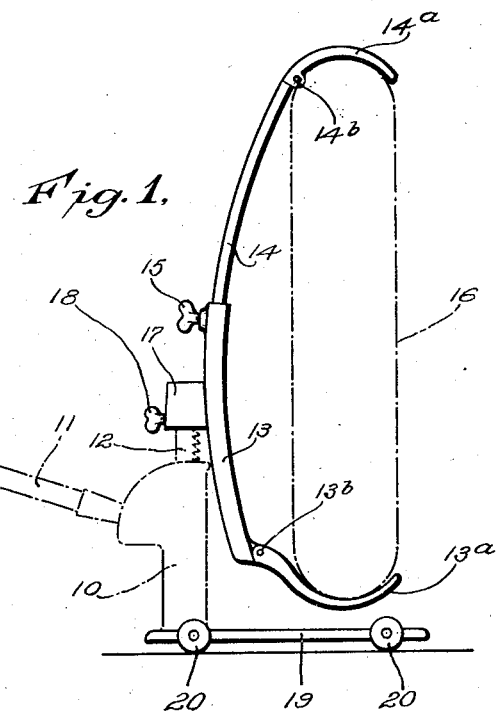
Fig. 1 is a view in side elevation of an apparatus embodying the invention, a conventional tire jack being indicated in dotted lines, and an automobile tire being also indicated in dotted lines in position to be handled by the apparatus.

In the accompanying drawings I have indicated a conventional type of jack in dotted lines at 10, and an operating handle for the jack at 11. The jack may be either of mechanical or hydraulic type and includes a vertically movable lifting element 12 to which the tire engaging device of the present invention is adapted to be attached.

The tire engaging device includes a pair of arms 13 and 14, slightly curved and telescoping one within the other. Preferably a clamping screw 15 mounted in the arm 13 binds upon the arm to retain the same in extended or collapsed position. The arm 13 includes a curved lateral forked extension including arms 13ª adapted to engage under a tire or wheel indicated in dotted lines at 16, and the upper arm 14 includes a generally similar extension 14ª engageable with the upper side of a tire or wheel. When the two clamping portions 13ª and 14ª are properly adjusted, the clamping screw 15 is turned to lock the arms 13 and 14 in adjusted position.

Preferably the arm 13 carries means for attachment to the lifting element 12 of the jack. This means may conveniently take the form of a collar or socket 17 encircling the lifting element 12 of the jack and clamped in place thereon by a screw 18.

The manner of using the device will be obvious. After a vehicle has been jacked up by the use of a conventional jack, the device of the present invention is placed beside the wheel, the arms 13 and 14 are pulled to extended position, and the jack and arms move laterally until the extensions 13ª and 14ª straddle the tire or wheel 16. The arms 13 and 14 are locked in properly adjusted tire clamping position by the screw 15, and by sliding the jack 10 rearwardly, the tire and its associated rim will be removed. The jack handle 11 is then operated to lower the arms 13 and 14 until the tire rests upon the ground. A reverse operation takes place when applying a tire or wheel.

This device obviously renders the application or removal of a tire or wheel by a woman extremely easy and expeditious and devoid of the necessity for hard manual labor.

Inasmuch as the tire lifting apparatus may frequently require to be shifted in and out under a wheel on dirt roads, as well as on smooth surfaces, I preferably mount the jack 10 on one end of a base plate 19, the base plate being supported on rollers or casters 20 to facilitate the bodily movement of the tire manipulating device. The relatively long heavy base plate also offers a substantial supporting means to prevent the apparatus from tipping over under the weight of a tire or wheel.

Figure 2:
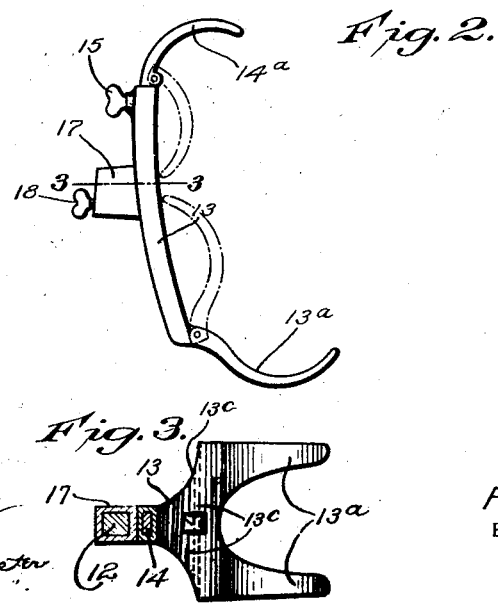
Fig. 2 is a view of the tire engaging and supporting device showing the same in collapsed position for purposes of storage, the dotted lines indicating the folded position of the outer ends of the arms.
Figure 3:
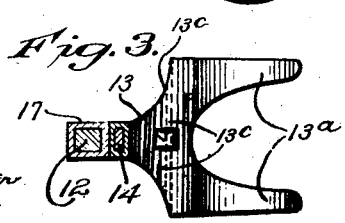
Fig. 3 is a sectional plan view on the line 3—3 of Fig. 2.

Preferably the connection of the socket or sleeve 17 with the lifting element of the jack is such that the tire manipulating device may be readily removed from the jack and collapsed as shown in Fig. 2 for purposes of storage.

The arms 13 and 14 may if desired, be formed of a pair of sections pivotally connected together by pivot pins 13ᵇ, 14ᵇ. The two sections of the arm 13 are formed with aligned apertured ears 13ᶜ for the reception of the pivot pin 13ᵇ, the ears limiting the outward folding movement of the arms. A similar construction is employed for connecting the two sections of the arm 14 by the pivot pin 14ᵇ. This construction permits of the tire handling element being folded into a comparatively small space when the outer ends of the arms are swung inwardly on their pivots to the dotted line position of Fig. 2.

Various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim:

1. The combination with a base plate and a jack mounted adjacent one end of the base plate of tire engaging devices including a pair of telescoping arms adapted to be locked in various positions of relative adjustment, a pair of curved tire embracing extensions at the ends of the arms and means carried by one arm detachably engageable with the lifting element of the jack, said means including a sleeve adapted to receive the lifting element and a clamping screw carried by the sleeve.

2. A device of the class described including a pair of telescoping arms, curved tire embracing extensions at the ends of the arms, means for locking the arms in various positions of relative adjustment and means carried by one arm detachably engageable with the lifting element of a jack, each of said arms including hinged sections near their free ends adapted to be folded over against the telescoping portions of the arms for purposes of storage.

FLORENCE ROGERS.